United States Patent Office 3,559,378
Patented Feb. 2, 1971

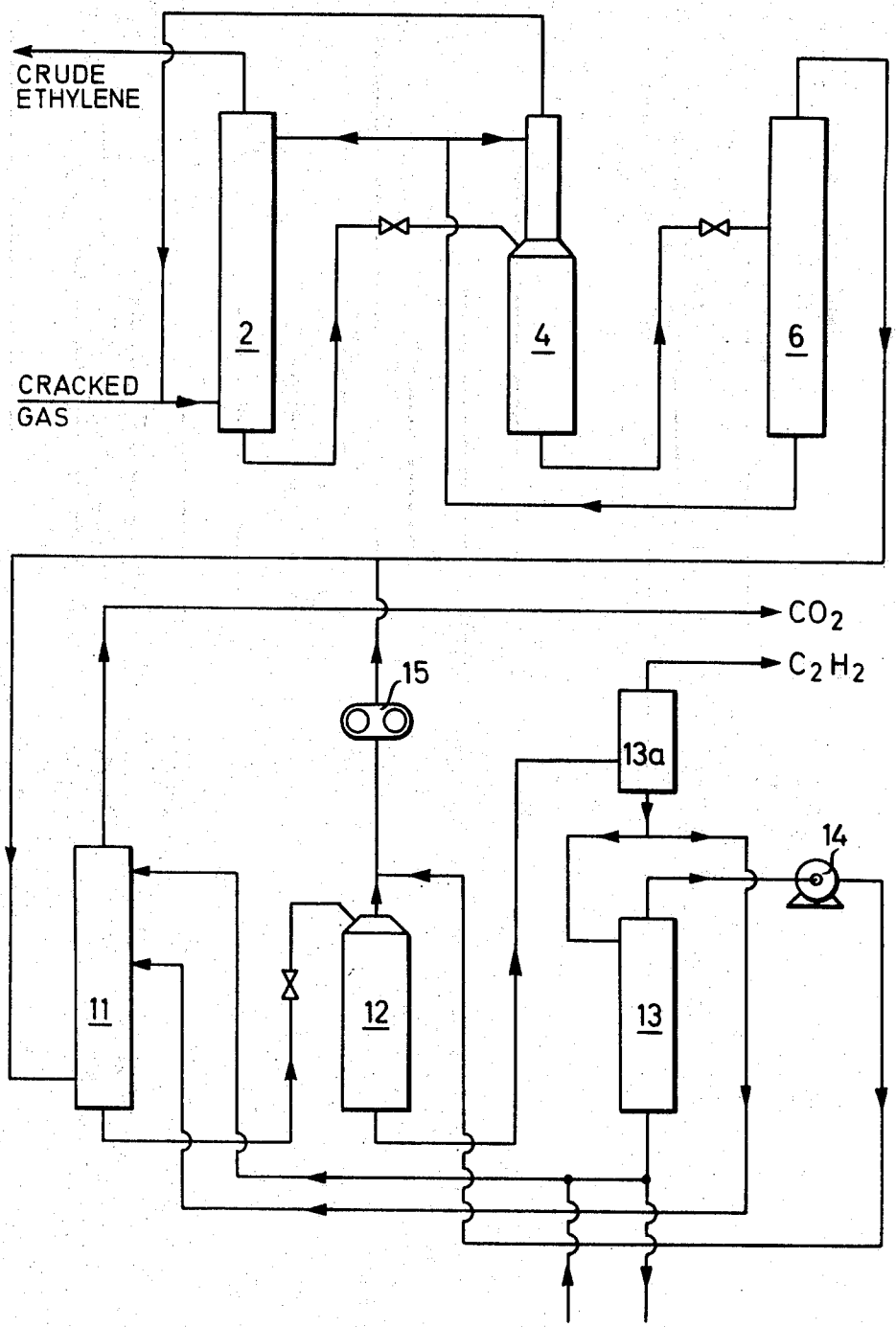

3,559,378
PROCESS FOR ISOLATING CARBON DIOXIDE AND ACETYLENE FROM CRACKED GASES
Walter Krause, Kelkheim, Taunus, Hartmut Schilken, Frankfurt am Main, and Günter Heck and Egon Malow, Hofheim, Taunus, Germany, assignors to Farbwerke Hoechst Aktiengesellschaft vormals Meister Lucius & Brüning, Frankfurt am Main, Germany, a corporation of Germany
Filed Jan. 12, 1970, Ser. No. 2,033
Claims priority, application Germany, Jan. 16, 1969, P 19 01 963.7
Int. Cl. B01d 19/00
U.S. Cl. 55—64           1 Claim

ABSTRACT OF THE DISCLOSURE

Improvement in the process for isolating carbon dioxide and acetylene from cracked gases which substantially contain hydrogen, carbon monoxide, methane, carbon dioxide, ethylene and acetylene, by multistage washings using acetone and dimethylformamide as solvents.

The present invention relates to a process for isolating carbon dioxide and acetylene from cracked gases and is an improvement in the invention which forms the subject matter of copending application Ser. No. 792,612 filed on Jan. 21, 1969.

The said patent application describes a process for isolating carbon dioxide and acetylene from cracked gases which have been compressed, prepurified and predried and substantially contain hydrogen, carbon monoxide, methane, carbon dioxide, ethylene, acetylene and small amounts of ethane, heavy hydrocarbons and water, by multistage washings using acetone and dimethylformamide as solvents, which process comprises the steps of:

(a) Subjecting the gas mixture to an acetone wash at a pressure in the range of from 10 to 20 atmospheres absolute and sump temperatures in the range of from −10° to −50° C., (b) Releasing the acetone solution obtained in step (a) in a fractionating absorption-desorption stage to a pressure in the range of from 2 to 6 atmospheres absolute at a sump temperature in the range of from −20° to +20° C., desorbing the gases, washing the desorbed gases with acetone until the desorbed gases contain from 10 to 20 mol percent of carbon dioxide and the reabsorbed gases contain at most, 0.2 mol percent, calculated on the amount in the initial gas mixture, of ethylene, (c) Releasing the gases reabsorbed in step (b) in a desorption stage to a pressure in the range of from 1 to 5.5 atmospheres absolute with a rise in temperature, freeing the thus desorbed gas mixture from water with an acetone wash and, (d) Subjecting the mixture of acetylene, carbon dioxide and ethylene obtained in step (c) to a dimethylformamide wash, the carbon dioxide and ethylene being withdrawn, and the acetylene absorbed by the dimethylformamide being expelled in a further desorption stage.

By further developing the above process, an improvement has now been found which enables any formation of decomposition products which may take place in the desorption of the acetylene from the dimethylformamide to be restricted and such decomposition products to be kept away from the acetylene product.

The present invention provides an improvement in the above process according to which the dimethylformamide current substantially charged with acetylene, which is obtained in the dimethylformamide wash after the carbon dioxide has been expelled, is predegassed at pressures in the range of from 1.05 to 1.3 atmospheres absolute and temperatures in the range of from 95° to 110° C., 60 to 70% of the dimethylformamide current which is still partially charged is then returned to the washing column of the above step (d), while the remaining amount of dimethylformamide is completely degassed at pressures in the range of from 0.25 to 0.55 atmosphere absolute and temperatures in the range of from 110° to 130° C.

The predegassing in accordance with the invention yields an acetylene of extremely high purity. In the following afterdegassing of the dimethylformamide, the residual amount of acetylene, unavoidable slight amounts of decomposition products, any leaking air which may be present and other difficulty soluble gases flow off at the head of the evacuated afterdegassing column. This gaseous mixture is also returned to the first column of the dimethylformamide wash and again washed.

As compared with the known process, the measures in accordance with the invention enable a purer acetylene to be obtained at the cost of a slightly increased contamination of the carbon dioxide. Of these impurities, the dimethylamine can easily be removed by a known water wash.

The invention will now be described by way of example only, with reference to the accompanying drawing. For the sake of clarity, only part of the pumps, heat exchangers and other auxiliary apparatus are shown. The upper half of the drawing comprising columns 2, 4 and 6 corresponds to the acetone wash of the older process. The lower half comprising columns 11, 12 and 13 and predegassing apparatus 13a shows the modified dimethylformamide wash of the invention.

EXAMPLE 3314 kmol./h. of a cracked gas which had been freed from higher acetylenes, hydrocarbons having 3 and 4 carbon atoms and higher hydrocarbons and had been predried, were separated in the acetone wash into crude ethylene and a mixture of carbon dioxide, acetylene and impurities.

The said mixture which contained 460 kmol./h. carbon dioxide, 300 kmol./h. acetylene, about 0.2% impurities and return gas, was conducted in column 11 in countercurrent to dimethylformamide of which 30 to 40% had been completely degassed or regenerated and 60 to 70% contained residual gases such as acetylene, dimethylamine, leaking air and, in special cases, formic acid.

At the head of column 11, slightly contaminated carbon dioxide flowed off. The sum product of column 11 was released in column 12 to a pressure of from 1.1 to 1.4 atmospheres absolute. By subsequent heating in predegassing apparatus 13a, the predominant part of the dissolved acetylene was set free at 100° C. under 1.1 atmospheres absolute and withdrawn as product. From the sump of predegassing apparatus 13a the dimethylformamide which had not yet been degassed completely was returned to an extent of 60 to 70% to column 11 while the remaining proportion of 30 to 40% was conducted to column 13 where it was degassed completely at 120° C. under a pressure of 0.4 atmosphere absolute, and then pressed into column 11 as regenerated solvent.

With the help of compressor 15 the pressure difference between the arriving gas mixture and the head of column 12 was overcome and the return gas pressed into column 11. The liquid piston type rotary blower 14 served to evacuate column 13 and transport the residual gases to the connecting member between the head of column 12 and the suction side of compressor 15.

What is claimed is:

1. In the process for isolating carbon dioxide and acetylene from cracked gases which have been compressed, prepurified and predried and substantially contain hydrogen, carbon monoxide, methane, carbon dioxide, ethylene, acetylene and small amounts of ethane, heavy hydrocarbons and water, by multistage washings using acetone and dimethylformamide as solvents by (a) subjecting the gas mixture to an acetone wash at a pressure in the range of from 10 to 20 atmospheres absolute and a sump temperature in the range of from −10° to −50° C.

(b) releasing the acetone solution obtained in step (a) in a fractionating absorption-desorption stage to a pressure in the range of from 2 to 6 atmosphere absolute at a sump temperature in the range of from −20° to +20° C., desorbing the gases, washing the desorbed gases with acetone until the desorbed gases contain from 10 to 20 mol percent of carbon dioxide and the reabsorbed gases contain at most 0.2 mol percent, calculated on the amount in the initial gas mixture, of ethylene, (c) releasing the gases reabsorbed in step (b) in a desorption stage to a pressure in the range of from 1 to 5.5 atmospheres absolute with a rise in temperature, freeing the thus desorbed gas mixture from water with an acetone wash and, (d) subjecting the mixture of acetylene, carbon dioxide and ethylene obtained in step (c) to a dimethylformamide wash, the carbon dioxide and ethylene being withdrawn, and the acetylene absorbed by the dimethylformamide being expelled in a further desorption stage, the improvement which comprises subjecting the dimethylformamide current substantially charged with acetylene, which is obtained in the dimethylformamide wash after the carbon dioxide has been expelled, to a predegassing at pressures in the range of from 1.05 to 1.3 atmospheres absolute and temperatures in the range of from 95° C. to 110° C., and then returning 60 to 70% of the dimethylformamide current which is still partially charged to the washing column of step (d), while completely degassing the remaining amount of dimethylformamide at pressures in the range of from 0.25 to 0.55 atmosphere absolute and temperatures in the range of from 110° to 130° C.

References Cited
UNITED STATES PATENTS

| | | | |
|---|---|---|---|
| 3,087,310 | 4/1963 | Rottmayr | 55—64X |
| 3,279,152 | 10/1966 | Rottmayr | 55—64X |

SAMIH N. ZAHARNA, Primary Examiner

R. W. BURKS, Assistant Examiner